United States Patent
Park et al.

(10) Patent No.: US 9,093,223 B2
(45) Date of Patent: Jul. 28, 2015

(54) MULTILAYER CERAMIC CAPACITOR AND MOUNTING BOARD HAVING MULTILAYER CERAMIC CAPACITOR MOUNTED THEREON

(71) Applicant: SAMSUNG ELECTRO-MECHANICS CO., LTD., Suwon, Gyunggi-do (KR)

(72) Inventors: Min Cheol Park, Suwon (KR); Sang Soo Park, Suwon (KR); Young Ghyu Ahn, Suwon (KR); Byoung Hwa Lee, Suwon (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 284 days.

(21) Appl. No.: 13/872,021

(22) Filed: Apr. 26, 2013

(65) Prior Publication Data

US 2014/0209362 A1   Jul. 31, 2014

(30) Foreign Application Priority Data

Jan. 29, 2013   (KR) .................. 10-2013-0009943

(51) Int. Cl.
*H01G 4/30*   (2006.01)
*H05K 1/16*   (2006.01)
(Continued)

(52) U.S. Cl.
CPC .................. *H01G 4/30* (2013.01); *H01G 2/065* (2013.01); *H01G 4/012* (2013.01); *H01G 4/12* (2013.01)

(58) Field of Classification Search
USPC ............ 174/260; 361/301.4, 303, 306.3, 311, 361/760
See application file for complete search history.

(56) References Cited

U.S. PATENT DOCUMENTS

2006/0158827 A1   7/2006   Lee et al.
2009/0009927 A1*  1/2009   Iguchi et al. ............... 361/321.5
(Continued)

FOREIGN PATENT DOCUMENTS

CN   101272991 A   9/2008
CN   102842424 A   12/2012
(Continued)

OTHER PUBLICATIONS

Office Action Japanese Patent Application No. 2013-089155 dated Dec. 17, 2013 with English translation.
(Continued)

*Primary Examiner* — Timothy Thompson
*Assistant Examiner* — Sherman Ng
(74) *Attorney, Agent, or Firm* — McDermott Will & Emery LLP (57) ABSTRACT

A multilayer ceramic capacitor includes: a ceramic body having laminated dielectric layers having an average thickness of 0.2-2.0 μm; an active layer including first and second internal electrodes alternately exposed through end surfaces of the ceramic body having the dielectric layer interposed therebetween and contributing to capacitance formation; upper and lower cover layers respectively formed above and below the active layer, the lower cover layer being thicker than the upper cover layer; first and second external electrodes covering the end surfaces of the ceramic body, wherein a bottommost internal electrode adjacent to the lower cover layer has an oxide layer formed on at least one of top and bottom surfaces thereof, and when lengths and thicknesses of the bottommost internal electrode and the oxide layer are denoted by '$L_e$,' '$t_e$' and '$L_o$,' '$t_o$', respectively, in a cross section of the ceramic body taken in length-thickness direction, $50\% < L_o/L_e \times 100$ and $30\% < t_o/t_e \times 100 < 80\%$ are satisfied.

14 Claims, 5 Drawing Sheets

(51) Int. Cl.
*H01G 4/005* (2006.01)
*H01G 4/228* (2006.01)
*H01G 4/06* (2006.01)
*H05K 7/00* (2006.01)
*H01G 2/06* (2006.01)
*H01G 4/012* (2006.01)
*H01G 4/12* (2006.01)

(56) References Cited

U.S. PATENT DOCUMENTS

| | | | |
|---|---|---|---|
| 2012/0168207 A1* | 7/2012 | Oh et al. | 174/254 |
| 2012/0236460 A1* | 9/2012 | Kim | 361/301.4 |
| 2012/0300361 A1 | 11/2012 | Togashi | |
| 2012/0327557 A1 | 12/2012 | Ahn et al. | |

FOREIGN PATENT DOCUMENTS

| | | |
|---|---|---|
| JP | 6-215978 A | 8/1994 |
| JP | 2000-340450 A | 12/2000 |
| JP | 3207846 B2 | 9/2001 |
| JP | 2006-203165 A | 8/2006 |
| JP | 2012-248581 A | 12/2012 |
| WO | 2007037973 A1 | 4/2007 |

OTHER PUBLICATIONS

Taiwanese Examination Report issued in Taiwanese Patent Application No. 102113569 dated Jun. 6, 2014, w/English translation.
Korean Office Action issued in Korean Application No. 10-2013-0009943 dated May 14, 2014, w/English translation.

* cited by examiner

MULTILAYER CERAMIC CAPACITOR AND MOUNTING BOARD HAVING MULTILAYER CERAMIC CAPACITOR MOUNTED THEREON

CROSS-REFERENCE TO RELATED APPLICATIONS

This application claims the priority of Korean Patent Application No. 10-2013-0009943 filed on Jan. 29, 2013, in the Korean Intellectual Property Office, the disclosure of which is incorporated herein by reference.

BACKGROUND OF THE INVENTION

1. Field of the Invention

The present invention relates to a multilayer ceramic capacitor and a mounting board having the multilayer ceramic capacitor mounted thereon.

2. Description of the Related Art

In general, a multilayer ceramic capacitor, a multilayer chip electronic component, is a chip type condenser mounted on circuit boards of various electronic products such as image display devices, including liquid crystal displays (LCDs), plasma display panels (PDPs), and the like, computers, smartphones, mobile phones, and the like, and serving to charge and discharge electricity.

This multilayer ceramic capacitor (MLCC) may be used as a component in various electronic products due to advantages of a relatively small size, high capacitance, and ease of mounting.

The multilayer ceramic capacitor may have a structure in which a plurality of dielectric layers and a plurality of internal electrodes having different polarities, interposed between the dielectric layers, are laminated alternately with each other.

Since the dielectric layers have piezoelectric properties and electrostrictive properties, a piezoelectric phenomenon may occur and thus cause vibrations among the internal electrodes when alternating current (AC) or direct current (DC) voltage is applied to the multilayer ceramic capacitor.

Such vibrations may be transferred to a printed circuit board on which the multilayer ceramic capacitor is mounted, through a solder connection of the multilayer ceramic capacitor, and the entire printed circuit board may become an acoustic reflection surface transmitting the vibrating sound as noise.

The vibrating sound may correspond to sound within an audible frequency range of 20 to 20000 Hz, and this vibrating sound, potentially providing unpleasant feeling to listeners is known as acoustic noise.

In order to reduce acoustic noise, products in which a lower cover layer of a multilayer ceramic capacitor included therein is thickened have been studied.

In addition, the multilayer ceramic capacitor with a thickened lower cover layer may be mounted on a printed circuit board in a horizontal mounting scheme while the thickened lower cover layer is located below, favorably reducing acoustic noise.

Meanwhile, in the case of the products in which a lower cover layer of a multilayer ceramic capacitor is thickened in order to reduce an amount of generated acoustic noise, the number of laminations is increased or the dielectric layer is thinned in order to implement a high degree of capacitance, but these may cause faults such as cracks or delamination during a sintering process.

RELATED ART DOCUMENT (Patent Document 1) Japanese Patent Laid-Open Publication No. 2006-203165

SUMMARY OF THE INVENTION

An aspect of the present invention provides a multilayer ceramic capacitor and a mounting board having the multilayer ceramic capacitor mounted thereon.

According to an aspect of the present invention, there is provided a multilayer ceramic capacitor, including: a ceramic body having a plurality of dielectric layers laminated therein, the dielectric layers respectively having an average thickness of 0.2 to 2.0 µm; an active layer including a plurality of first and second internal electrodes alternately exposed through both end surfaces of the ceramic body having the dielectric layer interposed therebetween and contributing to capacitance formation; an upper cover layer formed above the active layer; a lower cover layer formed below the active layer, the lower cover layer being thicker than the upper cover layer; and first and second external electrodes covering the end surfaces of the ceramic body, wherein a bottommost internal electrode adjacent to the lower cover layer has an oxide layer formed on at least one of top and bottom surfaces thereof, and when a length and a thickness of the bottommost internal electrode are denoted by $L_e$ and $t_e$, respectively, and a length and a thickness of the oxide layer are denoted by $L_o$ and $t_o$, respectively, in a cross section of the ceramic body taken in length and thickness directions, $50\% < L_o/L_e \times 100$ and $30\% < t_o/t_e \times 100 < 80\%$ are satisfied.

Here, when A denotes half of an overall thickness of the ceramic body, B denotes a thickness of the lower cover layer, C denotes half of an overall thickness of the active layer, and D denotes a thickness of the upper cover layer, a ratio of deviation of a center portion of the active layer from a center portion of the ceramic body, $(B+C)/A$, may satisfy $1.063 \leq (B+C)/A \leq 1.745$.

Here, when B denotes a thickness of the lower cover layer and D denotes a thickness of the upper cover layer, a ratio of the thickness of the upper cover layer to the thickness of the lower cover layer, $D/B$, may satisfy $0.021 \leq D/B \leq 0.422$.

Here, when A denotes half of an overall thickness of the ceramic body and B denotes a thickness of the lower cover layer, a ratio of the thickness of the lower cover layer to half of the overall thickness of the ceramic body, $B/A$, may satisfy $0.329 \leq B/A \leq 1.522$.

Here, when B denotes a thickness of the lower cover layer and C denotes half of an overall thickness of the active layer, a ratio of half of the overall thickness of the active layer to the thickness of the lower cover layer, $C/B$, may satisfy $0.146 \leq C/B \leq 2.458$.

Here, a point of inflection formed on each of both end surfaces of the ceramic body may be positioned at a height equal to or below a center of the ceramic body, due to a difference between a deformation rate occurring in a center portion of the active layer and a deformation rate occurring in the lower cover layer, at the time of application of voltage.

The dielectric layers may be laminated in an amount of 150 layers or more.

According to another aspect of the present invention, there is provided a mounting board having a multilayer ceramic capacitor mounted thereon, the mounting board including: a printed circuit board having first and second electrode pads formed thereon; and a multilayer ceramic capacitor mounted on the printed circuit board, wherein the multilayer ceramic capacitor includes: a ceramic body having a plurality of dielectric layers laminated therein, the dielectric layers respectively having an average thickness of 0.2 to 2.0 μm; an active layer including a plurality of first and second internal electrodes alternately exposed through both end surfaces of the ceramic body having the dielectric layer interposed therebetween and contributing to capacitance formation; an upper cover layer formed above the active layer; a lower cover layer formed below the active layer, the lower cover layer being thicker than the upper cover layer; and first and second external electrodes covering both end surfaces of the ceramic body while being connected to the first and second electrode pads through soldering, and wherein a bottommost internal electrode adjacent to the lower cover layer has an oxide layer formed on at least top and bottom surfaces thereof, and when a length and a thickness of the bottommost internal electrode are denoted by $L_e$ and $t_e$, respectively, and a length and a thickness of the oxide layer are denoted by $L_o$ and $t_o$, respectively, in a cross section of the ceramic body taken in length and thickness directions, $50\% < L_o/L_e \times 100$ and $30\% < t_o/t_e \times 100 < 80\%$ are satisfied.

Here, when A denotes half of an overall thickness of the ceramic body, B denotes a thickness of the lower cover layer, C denotes half of an overall thickness of the active layer, and D denotes a thickness of the upper cover layer, a ratio of deviation of a center portion of the active layer from a center portion of the ceramic body, $(B+C)/A$, may satisfy $1.063 \leq (B+C)/A \leq 1.745$.

Here, when B denotes a thickness of the lower cover layer and D denotes a thickness of the upper cover layer, a ratio of the thickness of the upper cover layer to the thickness of the lower cover layer, $D/B$, may satisfy $0.021 \leq D/B \leq 0.422$.

Here, when A denotes half of an overall thickness of the ceramic body and B denotes a thickness of the lower cover layer, a ratio of the thickness of the lower cover layer to half of the overall thickness of the ceramic body, $B/A$, may satisfy $0.329 \leq B/A \leq 1.522$.

Here, when B denotes a thickness of the lower cover layer and C denotes half of an overall thickness of the active layer, a ratio of half of the overall thickness of the active layer to the thickness of the lower cover layer, $C/B$, may satisfy $0.146 \leq C/B \leq 2.458$.

Here, a point of inflection formed on each of both end surfaces of the ceramic body may be positioned at a height equal to or below the soldering, due to a difference between a deformation rate occurring in a center portion of the active layer and a deformation rate occurring in the lower cover layer, at the time of application of voltage.

The dielectric layers may be laminated in an amount of 150 layers or more.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of components may be exaggerated for clarity, and the same reference numerals will be used throughout to designate the same or like components.

When directions of a hexahedron are defined in order to clearly describe embodiments of the invention, L, W, and T directions depicted in the drawings indicate length, width, and thickness directions, respectively. Here, the thickness direction may be used to denote a lamination direction in which dielectric layers are laminated.

In addition, in the embodiments of the invention, surfaces on which first and second external electrodes are formed in a length direction of a ceramic body are defined as both end surfaces, and surfaces vertically crossing the end surfaces are defined as side surfaces.

In addition, $S_T$ denotes atop surface of the ceramic body, associated with an upper cover layer, and $S_B$ denotes a bottom surface of the ceramic body, associated with a lower cover layer.

Embodiments of the invention will now be described in detail with reference to the accompanying drawings.

Figure 1:
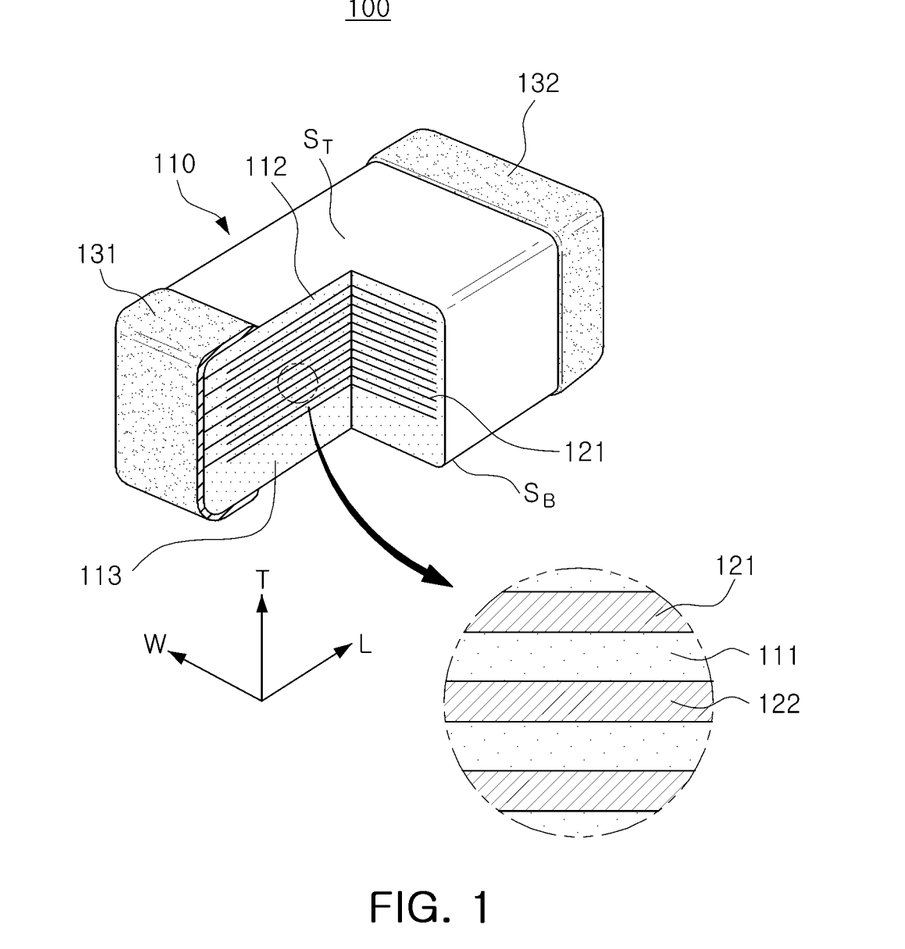
FIG. 1 is a perspective view schematically showing a multilayer ceramic capacitor according to an embodiment of the present invention, of which a portion is removed.

FIG. 1 is a perspective view schematically showing a multilayer ceramic capacitor according to an embodiment of the invention, of which a portion is removed.

Figure 2:
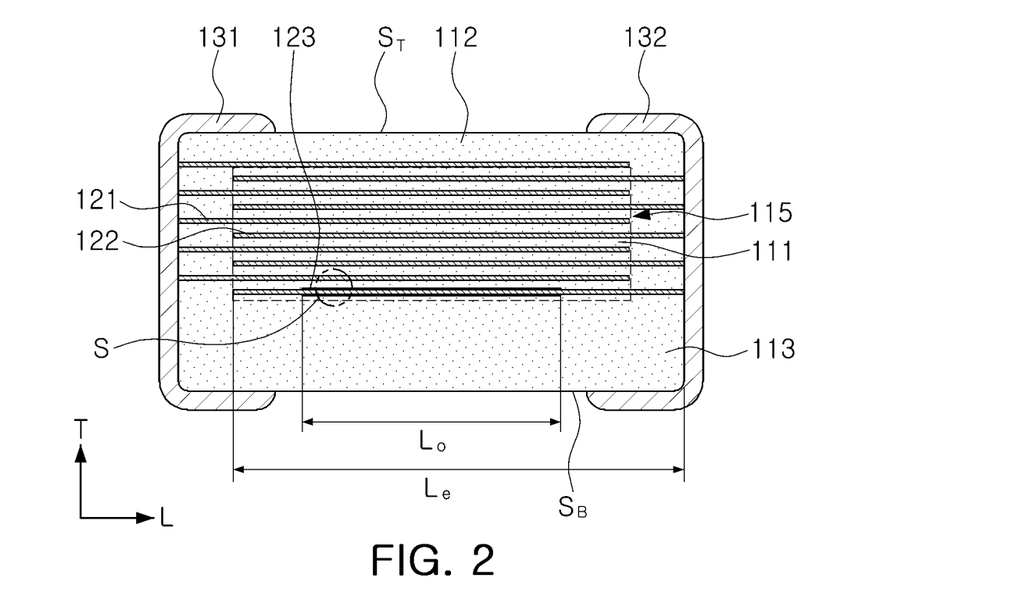
FIG. 2 is a cross-sectional view showing the multilayer ceramic capacitor of FIG. 1, cut in a length direction thereof.

FIG. 2 is a cross-sectional view showing the multilayer ceramic capacitor of FIG. 1, cut in a length direction thereof.

Figure 3:
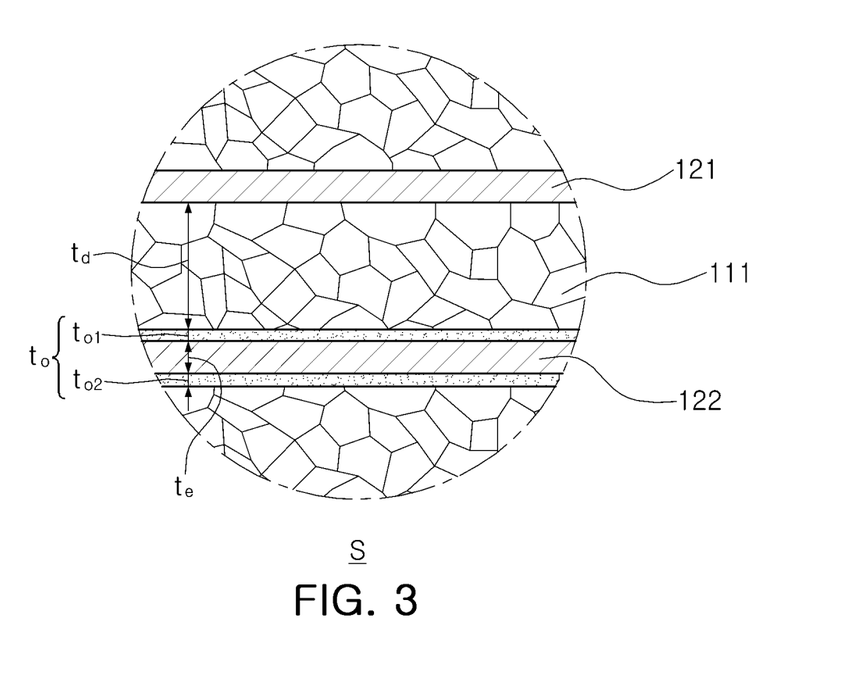
FIG. 3 is an enlarged view of Region S of FIG. 2.

FIG. 3 is an enlarged view of Region S of FIG. 2.

Figure 4:
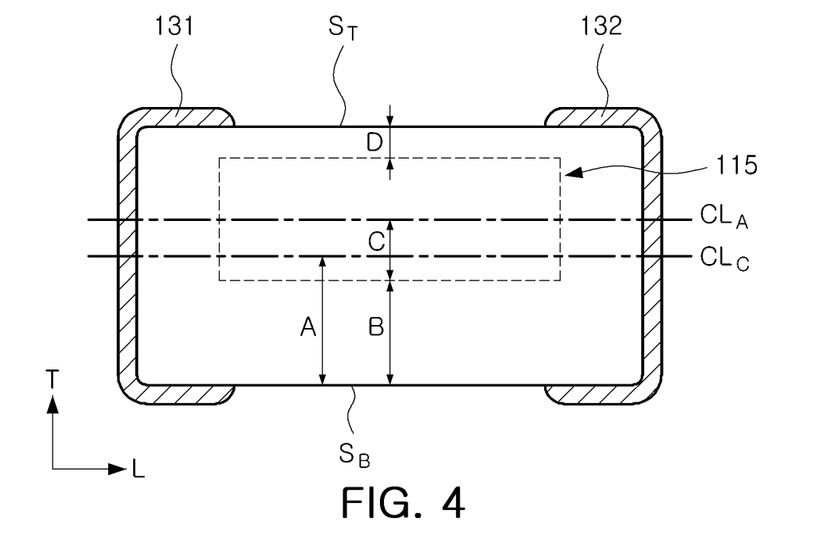
FIG. 4 is a cross-sectional view schematically showing the multilayer ceramic capacitor of FIG. 1, cut in a length direction thereof, to illustrate dimensional relationships among components included in the multilayer ceramic capacitor.

FIG. 4 is a cross-sectional view schematically showing the multilayer ceramic capacitor of FIG. 1, cut in the length direction thereof, to illustrate dimensional relationships among components included in the multilayer ceramic capacitor.

Referring to FIGS. 1 and 3, a multilayer ceramic capacitor 100 according to an embodiment of the invention may include a ceramic body 110, an active layer 115 including first and second internal electrodes 121 and 122, upper and lower cover layers 112 and 113, and first and second external electrodes 131 and 132 covering both end surfaces of the ceramic body 110.

The ceramic body 110 may be formed by laminating a plurality of dielectric layers 111 and then sintering them. The shape, dimension, and number of the dielectric layers 111 of the ceramic body 110 are not limited to those exemplified in the present embodiment.

In addition, the plurality of dielectric layers 111 constituting the ceramic body 110 are in a sintered state, and adjacent dielectric layers 111 may be integrated with each other such that boundaries therebetween may not be readily apparent without the use of a scanning electron microscope (SEM).

The ceramic body 110 may include the active layer 115 contributing to capacitance formation, and the upper and lower cover layers 112 and 113 formed above and below the active layer 115 as margin parts.

The active layer 115 may be formed by repeatedly laminating the plurality of first and second internal electrodes 121 and 122 with the dielectric layer 111 interposed therebetween.

According to the embodiment of the invention, an average thickness of the dielectric layer 111 may be optionally changed depending on intended capacitance of the multilayer ceramic capacitor 100. The average thickness of one dielectric layer after sintering may be 0.2 to 2.0 μm.

The average thickness of the dielectric layer 111 may be measured from an image obtained by scanning a cross section of the ceramic body 110 in a length direction thereof using a scanning electron microscope (SEM), as shown in FIG. 2.

For example, as shown in FIG. 2, with respect to any dielectric layer extracted from an image obtained by scanning a cross section of the ceramic body 110 in a length-thickness (L-T) direction, cut in a center portion of the ceramic body 110 in a width (W) direction thereof, the average thickness of the dielectric layer may be obtained by measuring thicknesses thereof at 30 equidistant points in a length direction and then calculating an average value of the measured thicknesses.

The 30 equidistant points may be positioned in the capacitance forming part that refers to an area in which the first and second internal electrodes 121 and 122 overlap each other.

In addition, when this measurement for obtaining the average thickness value is extensively performed with respect to ten or more dielectric layers and the average measurement value thereof is calculated, the average thickness of the dielectric layer may be further generalized.

When the average thickness of the dielectric layer 111 satisfies 0.2 to 2.0 μm, a multilayer ceramic capacitor having excellent reliability may be provided.

In the case in which the average thickness of the dielectric layer 111 is below 0.2 μm, a distance between the internal electrodes becomes decreased, causing a short defect. In the case in which the average thickness of the dielectric layer 111 is above 2.0 μm, a high-capacitance multilayer ceramic capacitance may not be realized.

In addition, the dielectric layer 111 may contain a ceramic powder having high permittivity, for example, a barium titanate ($BaTiO_3$)-based powder or a strontium titanate ($SrTiO_3$)-based powder, but the invention is not limited thereto.

Dielectric layers for the upper and lower cover layers 112 and 113 may have the same material and constitution as those of the dielectric layers 111, except that the internal electrodes are not included.

The upper and lower cover layers 112 and 113 may be formed by laminating a single dielectric layer or two or more dielectric layers on top and bottom surfaces of the active layer 115 in a vertical direction, respectively. The upper and lower cover layers 112 and 113 may serve to fundamentally prevent damage of the first and second internal electrodes 121 and 122 due to physical or chemical stress exerted thereon.

In addition, the lower cover layer 113 may be thicker than the upper cover layer 112 by further increasing the number of laminated dielectric layers as compared with the upper cover layer 112.

Meanwhile, the first and second internal electrodes 121 and 122 may be pairs of electrodes having different polarities, and may be formed by printing a conductive paste containing conductive metal on the dielectric layer 111 to a predetermined thickness.

In addition, the first and second internal electrodes 121 and 122 may be alternately exposed through both end surfaces of the ceramic body. The first internal electrode 121 and the second internal electrode 122 may be electrically insulated from each other by the dielectric layer 111 disposed therebetween.

That is, the first and second internal electrodes 121 and 122 may be electrically connected to the first and second external electrodes 131 and 132 through portions thereof alternately exposed through both end surfaces of the ceramic body 110.

Therefore, when voltages are applied to the first and second external electrodes 131 and 132, charges formed between the first and second internal electrodes 121 and 122 facing each other are generated. Here, the capacitance of the multilayer ceramic capacitor 100 is proportional to an area of an overlap region between the first and second internal electrodes 121 and 122.

In addition, the conductive metal contained in the conductive paste for forming the first and second internal electrodes 121 and 122 may be nickel (Ni), copper (Cu), palladium (Pd), or an alloy thereof, but the invention is not limited thereto.

In addition, the conductive paste may be printed using a screen printing method, a gravure printing method, or the like, but the invention is not limited thereto.

The first and second external electrodes 131 and 132 may be formed of a conductive paste containing conductive metal. The conductive metal may be nickel (Ni), copper (Cu), palladium (Pd), gold (Au), or an alloy thereof, but the invention is not limited thereto.

According to the embodiment of the invention, a bottommost internal electrode 122 adjacent to the lower cover layer 113 may have an oxide layer 123 formed on at least one of top and bottom surfaces thereof. Here, in a cross section of the ceramic body 110 taken in length and thickness directions, when a length and a thickness of the bottommost internal electrode 122 are denoted by $L_e$ and $t_e$, respectively, and a length and a thickness of the oxide layer 123 are denoted by $L_o$ and $t_o$, respectively, $50\% < L_o/L_e \times 100$ and $30\% < t_o/t_e \times 100 < 80\%$ may be satisfied.

Generally, in the case of products in which a lower cover layer of a multilayer ceramic capacitor is thickened in order to reduce acoustic noise, the number of laminations is increased or the dielectric layer is thinned to implement a high degree of capacitance, but these may cause faults such as cracks or delamination or deterioration in breakdown voltage (BVD).

However, according to the embodiment of the invention, when the bottommost internal electrode 122 adjacent to the lower cover layer 113 has the oxide layer 123 formed on at least one of the top and bottom surfaces thereof and the length and the thickness of the bottommost internal electrode 122 are denoted by $L_e$ and $t_e$, respectively, and the length and the thickness of the oxide layer 123 are denoted by Lo and to, respectively, in the cross section of the ceramic body 110 taken in the length and thickness directions, the dimensions of the components are controlled to satisfy $50\% < L_o/L_e \times 100$ and $30\% < t_o/t_e \times 100 < 80\%$, whereby a high-capacitance multilayer ceramic capacitor having excellent reliability may be realized.

The length and the thickness of the bottommost internal electrode 122 adjacent to the lower cover layer 113 and the length and the thickness of the oxide layer 123 may be measured from the image obtained by scanning the cross section of the ceramic body 110 in the length direction using a scanning electron microscope (SEM), as shown in FIG. 2.

For example, as shown in FIG. 2, with respect to the bottommost internal electrode 122 adjacent to the lower cover layer 113, extracted from the image obtained by scanning the cross section of the ceramic body 110 in the length-thickness (L-T) direction, cut in the center portion of the ceramic body 110 in the width (W) direction, using a scanning electron microscope (SEM), an average thickness of the bottommost internal electrode 122 may be obtained by measuring thicknesses thereof at 30 equidistant points in a length direction thereof, and calculating an average value of the measured thicknesses.

The 30 equidistant points may be positioned in the capacitance forming part, an area in which the first and second internal electrodes 21 and 22 overlap each other.

In addition, the length of the bottommost internal electrode 122 adjacent to the lower cover layer 113 and the length of the oxide layer 123 may be respectively measured from the image of the bottommost internal electrode 122 adjacent to the lower cover layer 113, extracted from the image obtained by scanning the cross section of the ceramic body 110 in the length-thickness (L-T) direction, cut in the center portion of the ceramic body 110 in the width (W) direction, using a scanning electron microscope (SEM).

In the case in which a ratio of the length of the bottommost internal electrode 122 adjacent to the lower cover layer 113 to the length of the oxide layer 123 ($L_o/L_e \times 100$) is below 50%, cracks or delamination faults may occur, causing a deterioration in reliability.

In the case in which a ratio of the thickness of the bottommost internal electrode 122 adjacent to the lower cover layer 113 to the thickness of the oxide layer 123 ($t_o/t_e \times 100$) is below 30%, cracks or delamination faults may occur, causing a deterioration in reliability.

Meanwhile, in the case in which the ratio of the thickness of the bottommost internal electrode 122 adjacent to the lower cover layer 113 to the thickness of the oxide layer 123 ($t_o/t_e \times 100$) is above 80%, cracks or delamination faults may occur, causing a deterioration in reliability, so that a high-capacitance multilayer ceramic capacitor may not be realized.

Hereinafter, relationships between dimensions of components included in the multilayer ceramic capacitor according to the present embodiment and acoustic noise will be described.

Referring to FIG. 4, half of the overall thickness of the ceramic body 110 is denoted by A, the thickness of the lower cover layer 113 is denoted by B, half of the overall thickness of the active layer 115 is denoted by C, and the thickness of the upper cover layer 112 is denoted by D.

Here, the overall thickness of the ceramic body 110 refers to a distance between the top surface $S_T$ and the bottom surface $S_B$ of the ceramic body 110. The overall thickness of the active layer 115 refers to a distance from a top surface of the first internal electrode 121 located in the topmost portion of the active layer 115 to a bottom surface of the second internal electrode 122 located in the bottommost portion of the active layer 115.

In addition, the thickness B of the lower cover layer 113 refers to a distance from a top surface of the second internal electrode 122 located in the bottommost portion of the active layer 115 in the thickness direction to the bottom surface $S_B$ of the ceramic body 110, and the thickness D of the upper cover layer 112 refers to a distance from the top surface of the first internal electrode 121 located in the topmost portion of the active layer 115 in the thickness direction to the top surface $S_T$ of the ceramic body 110.

When different polarities of voltages are applied to the first and second external electrodes 131 and 132 formed at both ends of the multilayer ceramic capacitor 100, the ceramic body 110 expands or contracts in the thickness direction thereof due to the inverse piezoelectric effect of the dielectric layers 111, and both ends of the first and second external electrodes 131 and 132 contract and expand, contrary to expansion and contraction of the ceramic body 110 in the thickness direction, due to the Poisson effect.

Here, portions of both ends of the ceramic body having the first and second external electrodes 131 and 132 formed thereon corresponding to a center portion of the active layer 115 expand and contract maximally, a factor in the generation of acoustic noise.

That is, in the present embodiment, in order to reduce acoustic noise, a point of inflection (PI) formed on each of both end surfaces of the ceramic body 110 may be positioned at a height equal to or below a center $CL_c$ of the thickness of the ceramic body 110, due to a difference between a deformation rate of the center $CL_A$ of the active layer 115 and a deformation rate of the lower cover layer 113, at the time of the application of voltage.

Here, in order to further reduce acoustic noise, a ratio of deviation of the center $CL_A$ of the active layer 115 from the center $CL_c$ of the ceramic body 110, $(B+C)/A$, preferably satisfies $1.063 \leq (B+C)/A \leq 1.745$.

In addition, a ratio of the thickness D of the upper cover layer 112 to the thickness B of the lower cover layer 113, D/B, may satisfy $0.021 \leq D/B \leq 0.422$.

In addition, a ratio of the thickness B of the lower cover layer 113 to half A of the overall thickness of the ceramic body 110, B/A, may satisfy $0.329 \leq B/A \leq 1.522$.

In addition, a ratio of half C of the overall thickness of the active layer 115 to the thickness B of the lower cover layer 113, C/B, may satisfy $0.146 \leq C/B \leq 2.458$.

EXPERIMENTAL EXAMPLES

Each multilayer ceramic capacitor according to inventive and comparative examples of the invention was manufactured as follows.

A slurry including a powder of barium titanate ($BaTiO_3$) or the like was coated on carrier films and dried to prepare a plurality of ceramic green sheets having a thickness of 1.8 μm.

Then, a conductive paste for nickel internal electrodes was coated on the ceramic green sheets using a screen, to form internal electrodes.

The ceramic green sheets were laminated to form a laminate having an amount of about 370 layers while the ceramic green sheets not having internal electrodes formed thereon were laminated in a greater amount below the ceramic green sheets having internal electrodes formed thereon than above thereof. This laminate was subjected to isostatic pressing at 85° C. in the pressure condition of 1000 kgf/cm².

The ceramic laminate was cut into individual chips after the completion of pressing, and then the individual chips were subjected to debindering at 230° C. in an air atmosphere for 60 hours.

After that, the resultant chip was sintered in a reducing atmosphere under an oxygen partial pressure of $10^{-11}$ atm to $10^{-10}$ atm, lower than the equilibrium oxygen partial pressure of Ni/NiO, such that the internal electrodes are not oxidized at 1200° C. The size of the multilayer chip capacitor after sintering was about 1.64 mm×0.88 mm (L×W, 1608 size). Here, a manufacturing tolerance was within a range of ±0.1 mm in length×width (L×W) dimensions, and when the range of tolerance of the multilayer chip capacitor was satisfied, acoustic noise was measured by experimentation.

Next, an external electrode forming process, a plating process, and the like were carried out to manufacture the multilayer ceramic capacitor.

TABLE 1

| Sample | A (μm) | B (μm) | C (μm) | D (μm) | (B + C)/A | B/A | D/B | C/B | AN (dB) | Capacitance Implementation Ratio |
|---|---|---|---|---|---|---|---|---|---|---|
| 1* | 405.5 | 40.2 | 365.4 | 39.9 | 1.000 | 0.099 | 0.993 | 9.090 | 29.5 | OK |
| 2* | 436.0 | 70.4 | 365.9 | 69.7 | 1.001 | 0.161 | 0.990 | 5.197 | 25.7 | OK |
| 3* | 455.5 | 90.8 | 364.3 | 91.5 | 0.999 | 0.199 | 1.008 | 4.012 | 23.1 | OK |
| 4* | 508.1 | 24.9 | 361.1 | 269.1 | 0.760 | 0.049 | 10.807 | 14.502 | 31.2 | OK |
| 5* | 456.6 | 25.2 | 360.1 | 167.8 | 0.844 | 0.055 | 6.659 | 14.290 | 32.5 | OK |
| 6* | 527.3 | 30.2 | 191.0 | 642.4 | 0.419 | 0.057 | 21.272 | 6.325 | 30.3 | OK |
| 7* | 414.5 | 30.9 | 188.8 | 420.4 | 0.530 | 0.075 | 13.605 | 6.110 | 30.5 | OK |
| 8* | 516.2 | 39.4 | 360.7 | 271.5 | 0.775 | 0.076 | 6.891 | 9.155 | 28.2 | OK |
| 9* | 446.0 | 39.8 | 365.5 | 121.2 | 0.909 | 0.089 | 3.045 | 9.183 | 29.1 | OK |
| 10* | 469.1 | 40.6 | 364.2 | 169.1 | 0.863 | 0.087 | 4.165 | 8.970 | 27.9 | OK |
| 11* | 416.2 | 40.7 | 360.7 | 70.3 | 0.964 | 0.098 | 1.727 | 8.862 | 28.4 | OK |
| 12* | 428.3 | 40.8 | 360.0 | 95.7 | 0.936 | 0.095 | 2.346 | 8.824 | 28.9 | OK |
| 13* | 495.9 | 40.9 | 364.9 | 221.0 | 0.818 | 0.082 | 5.403 | 8.922 | 28.1 | OK |
| 14* | 435.9 | 25.0 | 421.3 | 4.2 | 1.024 | 0.057 | 0.168 | 16.852 | 31.6 | OK |
| 15* | 420.7 | 70.4 | 365.9 | 39.1 | 1.037 | 0.167 | 0.555 | 5.197 | 25.7 | OK |
| 16 | 431.7 | 94.8 | 364.3 | 40.0 | 1.063 | 0.220 | 0.422 | 3.843 | 19.9 | OK |
| 17 | 443.0 | 103.8 | 389.1 | 4.0 | 1.113 | 0.234 | 0.039 | 3.749 | 19.3 | OK |
| 18 | 443.7 | 119.8 | 363.2 | 41.1 | 1.089 | 0.270 | 0.343 | 3.032 | 18.7 | OK |
| 19 | 447.1 | 147.3 | 362.1 | 22.7 | 1.139 | 0.329 | 0.154 | 2.458 | 17.9 | OK |
| 20 | 452.8 | 164.7 | 360.2 | 20.4 | 1.159 | 0.364 | 0.124 | 2.187 | 17.3 | OK |
| 21 | 448.7 | 170.3 | 361.0 | 5.1 | 1.184 | 0.380 | 0.030 | 2.120 | 17.2 | OK |
| 22 | 470.7 | 170.4 | 365.4 | 40.2 | 1.138 | 0.362 | 0.236 | 2.144 | 17.4 | OK |
| 23 | 491.9 | 220.3 | 360.8 | 41.8 | 1.181 | 0.448 | 0.190 | 1.638 | 16.9 | OK |
| 24 | 500.6 | 270.2 | 360.5 | 9.9 | 1.260 | 0.540 | 0.037 | 1.334 | 16.8 | OK |
| 25 | 516.9 | 270.4 | 361.8 | 39.7 | 1.223 | 0.523 | 0.147 | 1.338 | 16.7 | OK |
| 26 | 502.1 | 364.9 | 312.3 | 14.7 | 1.349 | 0.727 | 0.040 | 0.856 | 16.6 | OK |
| 27 | 407.5 | 421.8 | 189.1 | 14.9 | 1.499 | 1.035 | 0.035 | 0.448 | 16.6 | OK |
| 28 | 445.8 | 493.3 | 179.3 | 39.7 | 1.509 | 1.107 | 0.080 | 0.363 | 16.5 | OK |
| 29 | 483.7 | 632.0 | 160.1 | 15.2 | 1.638 | 1.307 | 0.024 | 0.253 | 16.4 | OK |
| 30 | 520.0 | 643.4 | 190.7 | 15.2 | 1.604 | 1.237 | 0.024 | 0.296 | 16.4 | OK |
| 31 | 486.4 | 685.3 | 121.1 | 45.3 | 1.658 | 1.409 | 0.066 | 0.177 | 16.4 | OK |
| 32 | 507.2 | 742.7 | 120.8 | 30.1 | 1.702 | 1.464 | 0.041 | 0.163 | 16.4 | OK |
| 33 | 515.2 | 773.9 | 118.2 | 20.1 | 1.732 | 1.502 | 0.026 | 0.153 | 16.4 | OK |
| 34 | 524.5 | 798.2 | 116.9 | 16.9 | 1.745 | 1.522 | 0.021 | 0.146 | 16.3 | OK |
| 35* | 533.4 | 832.4 | 109.8 | 14.8 | 1.766 | 1.561 | 0.018 | 0.132 | 16.3 | NG |
| 36* | 533.3 | 841.1 | 105.3 | 14.9 | 1.775 | 1.577 | 0.018 | 0.125 | 16.3 | NG |
| 37* | 534.1 | 849.7 | 101.2 | 16.1 | 1.780 | 1.591 | 0.019 | 0.119 | 16.3 | NG |

*: Comparative Example, AN: acoustic noise

Table 1 above contains data relating to the dimensions of respective components, which were measured based on an image obtained by scanning a cross section of the ceramic body 110 in the length-thickness (L-T) directions cut in a center portion of the ceramic body 110 of the multilayer ceramic capacitor 100 in the width direction (W) thereof, using a scanning electron microscope (SEM), as shown in FIG. 3.

Here, as described above, A denotes half of the overall thickness of the ceramic body 110, B denotes the thickness of the lower cover layer 113, C denotes half of the overall thickness of the active layer 115, and D denotes the thickness of the upper cover layer 112.

In order to measure acoustic noise, one sample (a single multilayer chip capacitor) per a single substrate was mounted on a printed circuit board for measuring acoustic noise, while upper and lower portions of the sample were differentiated from each other, and then the printed circuit board was seated on a measuring jig.

In addition, DC voltage and voltage variations were applied to both terminals of the sample seated on the measuring jig by using a DC power supply and a function generator. Acoustic noise was measured through a microphone installed directly above the printed circuit board.

In Table 1, Samples 1 to 3 are comparative examples respectively having a symmetrical cover structure in which the thickness B of the lower cover layer 113 is approximately similar to the thickness D of the upper cover layer 112, and Samples 4 to 13 are comparative examples respectively having a structure in which the thickness D of the upper cover layer 112 is greater than the thickness B of the lower cover layer 113.

In addition, Samples 14, 15, and 35 to 37 are comparative examples respectively having a structure in which the thickness B of lower cover layer 113 is greater than the thickness D of the upper cover layer 112, and Samples 16 to 34 are inventive examples according to the embodiment of the invention.

Here, in the case in which (B+C)/A is close to 1, it means that the center portion of the active layer 115 does not significantly deviate from the center portion of the ceramic body 110. In samples 1 to 3 respectively having a symmetrical cover structure in which the thickness B of the lower cover layer 113 is approximately similar to the thickness D of the upper cover layer 112, (B+C)/A is approximately 1.

In the case in which (B+C)/A is greater than 1, it means that the center portion of the active layer 115 deviates upwardly from the center portion of the ceramic body 110. In the case in which (B+C)/A is smaller than 1, it means that the center portion of the active layer 115 deviates downwardly from the center portion of the ceramic body 110.

Referring to Table 1, in Samples 16 to 34 in which the ratio of deviation of the center portion of the active layer 115 from the center portion of the ceramic body 110, (B+C)/A, satisfied 1.063≤(B+C)/A≤1.745, it may be confirmed that acoustic noise values thereof were significantly decreased to be below 20 dB.

In addition, each of Samples 1 to 15 in which the ratio of deviation of the center portion of the active layer 115 from the center portion of the ceramic body 110, (B+C)/A, was below 1.063, had a structure in which the center portion of the active layer 115 minutely deviates from the center portion of the ceramic body 110 or the center portion of the active layer 115 deviates downwardly from the center portion of the ceramic body 110.

In the forgoing samples 1 to 15 of which (B+C)/A was below 1.063, acoustic noise values thereof were 25 to 32.5 dB, and thus it may be confirmed that samples 1 to 15 were not effective in reducing acoustic noise as compared with the inventive examples of the invention.

In addition, each of Samples 35 to 37 in which the ratio of deviation of the center portion of the active layer 115 from the center portion of the ceramic body 110, (B+C)/A, was above 1.745 had low actual capacitance relative to target capacitance, causing defective capacitance.

In Table 1, in the case in which a "Capacitance Implementation Ratio" (that is, a ratio of actual capacitance to target capacitance) is marked by "NG", it means that the ratio of the actual capacitance to the target capacitance was below 80% when the target capacitance value was 100%.

In addition, it may be seen that, in the inventive examples in which the ratio D/B of the thickness D of the upper cover layer 112 to the thickness B of the lower cover layer 113 satisfied 0.021≤D/B≤0.422, acoustic noise was remarkably reduced.

On the other hand, in the comparative examples in which the ratio D/B of the thickness D of the upper cover layer 112 to the thickness B of the lower cover layer 113 was above 0.422, it may be confirmed that there was no effect in reducing acoustic noise.

In the case in which the ratio D/B of the thickness D of the upper cover layer 112 to the thickness B of the lower cover layer 113 is below 0.021, the thickness B of the lower cover layer 113 is excessively greater than the thickness D of the upper cover layer 112, causing cracking or delamination, while actual capacitance to target capacitance is low, causing defective capacitance.

In Samples 19 to 34 in which the ratio B/A of the thickness B of the lower cover layer 113 to half A of the overall thickness of the ceramic body 110 and the ratio C/B of half C of the overall thickness of the active layer 115 to the thickness B of the lower cover layer 113 satisfied 0.329≤B/A≤1.522 and 0.146≤C/B≤2.458, it may be confirmed that acoustic noise values thereof were further decreased to a level below 18 dB.

On the other hand, in each of Samples 35 to 37 in which the ratio B/A of the thickness B of the lower cover layer 113 to half A of the overall thickness of the ceramic body 110 was above 1.522 and the ratio C/B of half C of the overall thickness of active layer 115 to the thickness B of the lower cover layer 113 was below 0.146, the actual capacitance to target capacitance was low, causing defective capacitance.

Table 2 below shows comparisons in crack occurrence and capacitance among the multilayer ceramic capacitor samples depending on a ratio of length $L_o$ of the oxide layer 123 to length $L_e$ of the bottommost internal electrode 122 adjacent to the lower cover layer 113 ($L_o/L_e \times 100$) and a ratio of thickness $t_o$ of the oxide layer 123 to thickness $t_e$ of the bottommost internal electrode 122 adjacent to the lower cover layer 113 ($t_o/t_e \times 100$).

In table 2, "OK" is marked when the actual capacitance is 90% or higher of the target capacitance, and "NG" is marked when the actual capacitance is below 90% of the target capacitance.

TABLE 2

| Sample | Ratio of Length of Oxide Layer to Length of Bottommost Internal Electrode (%) | Ratio of Thickness of Oxide Layer to Thickness of Bottommost Internal Electrode (%) | Crack Occurrence (%) | Capacitance |
|---|---|---|---|---|
| *1 | 25 | 9.2 | 22 | OK |
| *2 | 39 | 16.5 | 16 | OK |
| *3 | 41 | 26.5 | 6 | OK |
| 4 | 51 | 30.4 | 0 | OK |
| 5 | 72 | 46.2 | 0 | OK |
| 6 | 85 | 52.6 | 0 | OK |
| 7 | 96 | 58.4 | 0 | OK |
| 8 | 100 | 65.7 | 0 | OK |
| 9 | 100 | 79.6 | 0 | OK |
| *10 | 100 | 83.2 | 4 | OK |
| *11 | 100 | 89.4 | 8 | NG |
| *12 | 100 | 98.5 | 14 | NG |

*: Comparative Example

Referring to Table 2 above, it may be seen that Samples 1, 2, 3, 10, 11, and 12, which deviated from the numerical ranges of the inventive examples of the invention, had a high degree of crack occurrence, causing a deterioration in reliability.

In particular, it may be seen that Samples 11 and 12 did not obtain a desired level of capacitance, failing to realize a high-capacitance multilayer ceramic capacitor.

Meanwhile, it may be seen that Samples 4 to 9, which were within the numerical ranges of the inventive examples of the invention, had a low degree of crack occurrence, and thus had excellent reliability, so that a high-capacitance multilayer ceramic capacitor can be realized.

Mounting Board Having Multilayer Ceramic Capacitor Mounted Thereon

Figure 5:
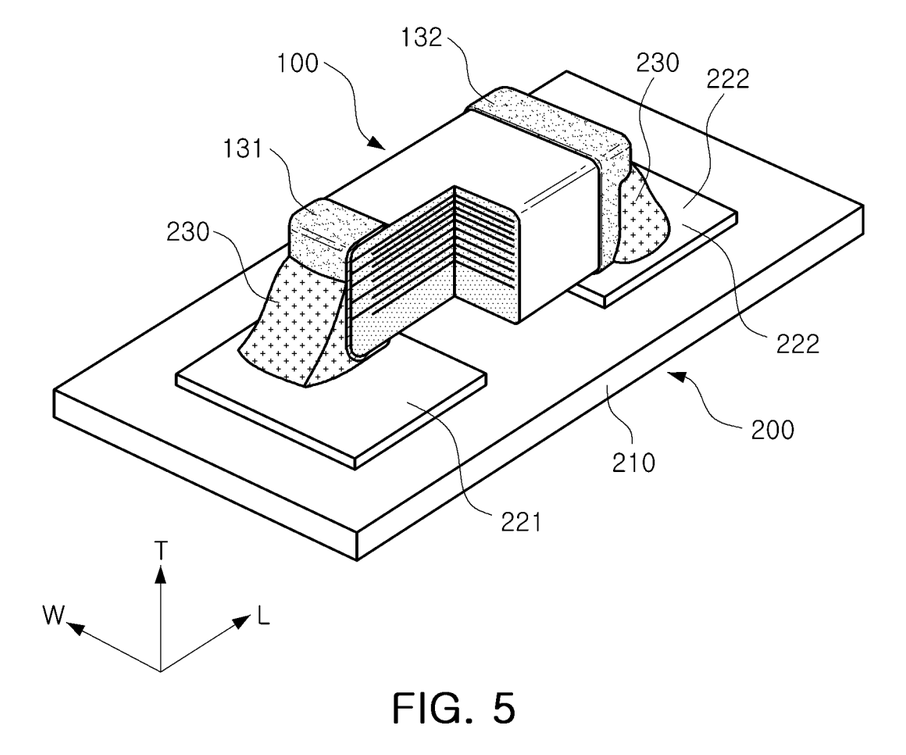
FIG. 5 is a perspective view showing a state in which the multilayer ceramic capacitor of FIG. 1 is mounted on a printed circuit board.
Figure 6:
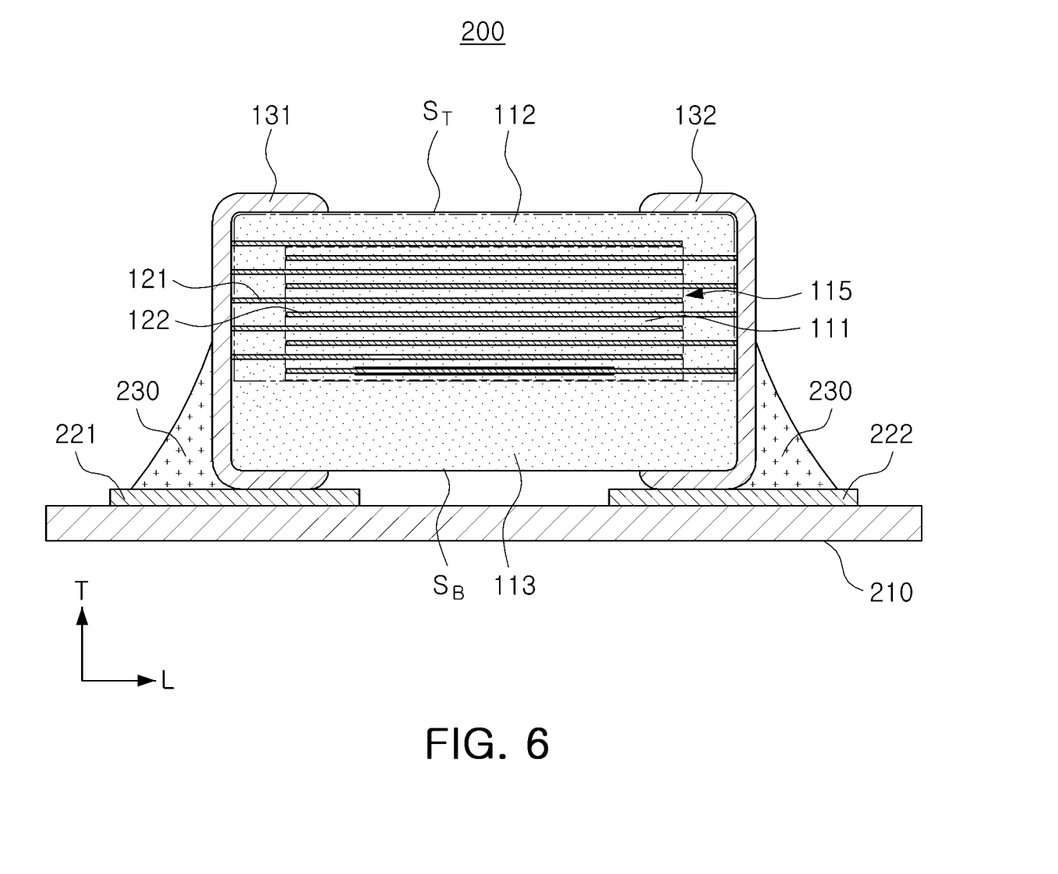
FIG. 6 is a cross-sectional view showing the multilayer ceramic capacitor and the printed circuit board of FIG. 5, cut in a length direction thereof.

Referring to FIGS. 5 and 6, a mounting board 200 for the multilayer ceramic capacitor 100 according to the present embodiment may include a printed circuit board 210 on which the multilayer ceramic capacitor 100 is horizontally mounted; and first and second electrode pads 221 and 222 spaced apart from each other on a top surface of the printed circuit board 210.

Here, the multilayer ceramic capacitor 100 may be electrically connected to the printed circuit board 210 by soldering 230, while the lower cover layer 113 is located downwardly and the first and second external electrodes 131 and 132 are positioned on and in contact with the first and second electrode pads 221 and 222, respectively.

When voltage is applied while the multilayer ceramic capacitor 100 is mounted on the printed circuit board 210 as described above, acoustic noise may be generated.

Here, the size of the first and second electrode pads 221 and 222 may be an index for determining the amount of soldering 230 which connects the first and second external electrodes 131 and 132 of the multilayer ceramic capacitor 100 and the first and second electrode pads 221 and 222, and the level of acoustic noise can be controlled depending on the amount of soldering 230.

Figure 7:
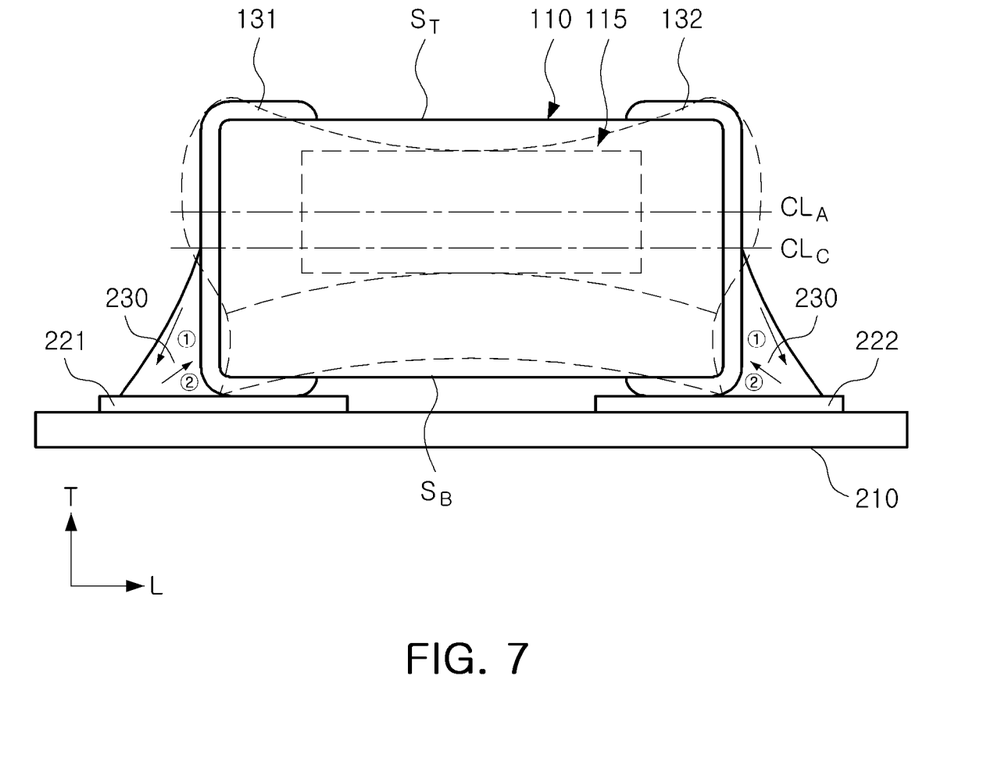
FIG. 7 is a cross-sectional view schematically showing a state in which the multilayer ceramic capacitor of FIG. 4 is transformed by an application of voltage while the multilayer ceramic capacitor is mounted on the printed circuit board.

Referring to FIG. 7, when voltages of different polarities are applied to the first and second external electrodes 131 and 132 formed at both ends of the multilayer ceramic capacitor 100 while the multilayer ceramic capacitor 100 is mounted on the printed circuit board 210, the ceramic body 110 expands and contracts in the thickness direction thereof due to the inverse piezoelectric effect of the dielectric layers 111, and both end portions of the first and second external electrodes 131 and 132 contract and expand, contrary to expansion and contraction of the ceramic body 110 in the thickness direction, due to the Poisson effect.

Here, portions of both ends of the ceramic body having the first and second external electrodes 131 and 132 formed thereon corresponding to a center portion of the active layer 115 expand and contract maximally, a factor in the generation of acoustic noise.

When both end surfaces of the multilayer ceramic capacitor 100 in the length direction thereof expand significantly, expansive force ① allowing an upper portion of the soldering 230 to be pushed outwardly is generated due to the expansion, and contraction force ② causing a lower portion of the soldering 230 to be pulled toward the external electrodes is generated due to the expansive force.

Therefore, when a point of inflection formed on each of both end surfaces of the ceramic body 110 is positioned at a height of the soldering 230 or therebelow, due to a difference between a deformation rate of the center $CL_A$ of the active layer 115 and a deformation rate of the lower cover layer 113, at the time of the application of voltage, acoustic noise can be further reduced.

As set forth above, according to the embodiments of the present invention, vibrations occurring in a multilayer ceramic capacitor can be reduced, so that acoustic noise can be reduced when the multilayer ceramic capacitor is mounted on a printed circuit board, and the assembling efficiency of the mounting board can be improved, and a defect rate of the mounting board can be decreased.

Further, according to the embodiments of the present invention, there can be provided a multilayer ceramic capacitor having excellent reliability by controlling the lengths and thicknesses of the bottommost internal electrode adjacent to the lower cover layer and the oxide layer formed on at least one of top and bottom surfaces of the bottommost internal electrode.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor, comprising:
a ceramic body having a plurality of dielectric layers laminated therein, the dielectric layers respectively having an average thickness of 0.2 to 2.0 μm;
an active layer including a plurality of first and second internal electrodes alternately exposed through both end surfaces of the ceramic body having the dielectric layer interposed therebetween and contributing to capacitance formation;
an upper cover layer formed above the active layer;
a lower cover layer formed below the active layer, the lower cover layer being thicker than the upper cover layer; and
first and second external electrodes covering the end surfaces of the ceramic body,
wherein a bottommost internal electrode adjacent to the lower cover layer has an oxide layer formed on at least one of top and bottom surfaces thereof, and
when a length and a thickness of the bottommost internal electrode are denoted by $L_e$ and $t_e$, respectively, and a length and a thickness of the oxide layer are denoted by $L_o$ and $t_o$, respectively, in a cross section of the ceramic body taken in length and thickness directions, $50\% < L_o/L_e \times 100$ and $30\% < t_o/t_e \times 100 < 80\%$ are satisfied.

2. The multilayer ceramic capacitor of claim 1, wherein when A denotes half of an overall thickness of the ceramic body, B denotes a thickness of the lower cover layer, C denotes half of an overall thickness of the active layer, and D denotes a thickness of the upper cover layer, a ratio of deviation of a center portion of the active layer from a center portion of the ceramic body, (B+C)/A, satisfies $1.063 \le (B+C)/A \le 1.745$.

3. The multilayer ceramic capacitor of claim 1, wherein when B denotes a thickness of the lower cover layer and D denotes a thickness of the upper cover layer, a ratio of the thickness of the upper cover layer to the thickness of the lower cover layer, D/B, satisfies $0.021 \le D/B \le 0.422$.

4. The multilayer ceramic capacitor of claim 1, wherein when A denotes half of an overall thickness of the ceramic body and B denotes a thickness of the lower cover layer, a ratio of the thickness of the lower cover layer to half of the overall thickness of the ceramic body, B/A, satisfies $0.329 \le B/A \le 1.522$.

5. The multilayer ceramic capacitor of claim 1, wherein when B denotes a thickness of the lower cover layer and C denotes half of an overall thickness of the active layer, a ratio of half of the overall thickness of the active layer to the thickness of the lower cover layer, C/B, satisfies $0.146 \le C/B \le 2.458$.

6. The multilayer ceramic capacitor of claim 1, wherein a point of inflection formed on each of both end surfaces of the ceramic body is positioned at a height equal to or below a center of the ceramic body, due to a difference between a deformation rate occurring in a center portion of the active layer and a deformation rate occurring in the lower cover layer, at the time of application of voltage.

7. The multilayer ceramic capacitor of claim 1, wherein the dielectric layers are laminated in an amount of 150 layers or more.

8. A mounting board having a multilayer ceramic capacitor mounted thereon, the mounting board comprising:
a printed circuit board having first and second electrode pads formed thereon; and
a multilayer ceramic capacitor mounted on the printed circuit board,
wherein the multilayer ceramic capacitor includes:
a ceramic body having a plurality of dielectric layers laminated therein, the dielectric layers respectively having an average thickness of 0.2 to 2.0 μm;
an active layer including a plurality of first and second internal electrodes alternately exposed through both end surfaces of the ceramic body having the dielectric layer interposed therebetween and contributing to capacitance formation;
an upper cover layer formed above the active layer;
a lower cover layer formed below the active layer, the lower cover layer being thicker than the upper cover layer; and
first and second external electrodes covering both end surfaces of the ceramic body while being connected to the first and second electrode pads through soldering, and
wherein a bottommost internal electrode adjacent to the lower cover layer has an oxide layer formed on at least top and bottom surfaces thereof, and
when a length and a thickness of the bottommost internal electrode are denoted by $L_e$ and $t_e$, respectively, and a length and a thickness of the oxide layer are denoted by $L_o$ and $t_o$, respectively, in a cross section of the ceramic body taken in length and thickness directions, $50\% < L_o/L_e \times 100$ and $30\% < t_o/t_e \times 100 < 80\%$ are satisfied.

9. The mounting board of claim 8, wherein when A denotes half of an overall thickness of the ceramic body, B denotes a thickness of the lower cover layer, C denotes half of an overall thickness of the active layer, and D denotes a thickness of the upper cover layer, a ratio of deviation of a center portion of the active layer from a center portion of the ceramic body, (B+C)/A, satisfies $1.063 \leq (B+C)/A \leq 1.745$.

10. The mounting board of claim 8, wherein when B denotes a thickness of the lower cover layer and D denotes a thickness of the upper cover layer, a ratio of the thickness of the upper cover layer to the thickness of the lower cover layer, D/B, satisfies $0.021 \leq D/B \leq 0.422$.

11. The mounting board of claim 8, wherein when A denotes half of an overall thickness of the ceramic body and B denotes a thickness of the lower cover layer, a ratio of the thickness of the lower cover layer to half of the overall thickness of the ceramic body, B/A, satisfies $0.329 \leq B/A \leq 1.522$.

12. The mounting board of claim 8, wherein when B denotes a thickness of the lower cover layer and C denotes half of an overall thickness of the active layer, a ratio of half of the overall thickness of the active layer to the thickness of the lower cover layer, C/B, satisfies $0.146 \leq C/B \leq 2.458$.

13. The mounting board of claim 8, wherein a point of inflection formed on each of both end surfaces of the ceramic body is positioned at a height equal to or below the soldering, due to a difference between a deformation rate occurring in a center portion of the active layer and a deformation rate occurring in the lower cover layer, at the time of application of voltage.

14. The mounting board of claim 8, wherein the dielectric layers are laminated in an amount of 150 layers or more.

\* \* \* \* \*